United States Patent [19]

Uchida et al.

[11] Patent Number: 5,449,737
[45] Date of Patent: Sep. 12, 1995

[54] URETHANE MODIFIED EPOXY RESIN COMPOSITIONS

[75] Inventors: Hiroshi Uchida, Kurashiki; Akihiro Izumi, Nobeoka, both of Japan

[73] Assignee: Ciba-Geigy Corporation, Ardsley, N.Y.

[21] Appl. No.: 196,348

[22] Filed: Feb. 14, 1994

[51] Int. Cl.$^6$ ............... C08G 18/28; C08G 59/00; C08G 59/68
[52] U.S. Cl. ................ 528/73; 528/87; 528/88; 528/93
[58] Field of Search ............. 528/73, 87, 88, 93

[56] References Cited

U.S. PATENT DOCUMENTS

| | | | |
|---|---|---|---|
| 3,979,365 | 9/1976 | Tanaka et al. | 260/77.5 |
| 4,070,416 | 1/1978 | Narahara et al. | 260/830 |
| 5,112,932 | 5/1992 | Koenig et al. | 528/51 |

FOREIGN PATENT DOCUMENTS 3229772  2/1993  Japan .

OTHER PUBLICATIONS

Japan Industrial Standard, K 7236–1986, pp. 1–6.
Japanese Industrial Standard, Z 2247–1993, pp. 1–3.

*Primary Examiner*—Morton Foelak
*Attorney, Agent, or Firm*—William A. Teoli, Jr.

[57] ABSTRACT

A reaction product formed between an epoxy resin, a phenol compound such as bisphenol or the like and an isocyanate compound contains oxazolidone rings and it is a polymeric epoxy resin. Herein is provided an epoxy resin composition comprising said reaction product and a curing agent.

The said reaction product contains oxazolidone rings and epoxy groups, and is excellent in heat resistance and adhesive property. Further said reaction product is made into a polymer by the use of the bisphenol compound and at the same time it contains oxazolidone rings; it is excellent in toughness and water resistance. When a tetrabromobisphenol is used as the bisphenol compound, flame retardance is also good.

Accordingly, the epoxy resin composition of the present invention is excellent in heat resistance, toughness, adhesive property and water resistance. When a brominated compound is used as the phenol compound, the epoxy resin composition of the invention exhibits an excellent flame retardance.

9 Claims, No Drawings

URETHANE MODIFIED EPOXY RESIN COMPOSITIONS

The present invention relates to a heat-resistant and flame-retardant urethane modified epoxy resin composition.

More particularly, the present invention relates to an epoxy resin composition which is successfully usable in fields where flame-retardance, heat resistance, toughness, water resistance, adhesive properties, etc. are demanded, such as in the fields of coating material for use in civil engineering and construction, powder coating material, PCM (precoated metal) coating material, laminate board, scaling material, adhesive, composite material and the like.

Since epoxy resin is well balanced between heat resistance, chemical resistance and adhesive property, it has extensively been used up to today as a material of coating material for civil engineering and construction, powder coating material, PCM coating material, laminate board, sealing material, casting material, adhesive, composite material and the like. Particularly, Bisphenol A type epoxy resins have been widely used because they exhibit those performances simultaneously.

Recently, however, in these fields too, a new elementary resin material remarkably enhanced in performances and reliability as compared with prior resin materials is demanded. Particularly in the field of electric and electronic materials, the degree of integration of LSI mounted on electronic devices is becoming higher and higher, as the result of which a very high reliability is required of the material to be used there.

Thus, the elementary resin material is required to have excellent flame retardance, heat resistance, toughness, water resistance and adhesive property, and it is earnestly desired to develop a resin composition excellent in these performances.

Particularly, with the recent enhancement of degree of integration of LSI and increase in packaging density, the elementary resin material to be used in those electronic parts is required to have a more improved heat resistance, toughness, water resistance and adhesive property.

For example, though a straight chain epoxy resin constituted from Bisphenol A type epoxy resin and Tetrabromobisphenol A has widely been used up to today as a resin for laminate board, it has a fault that it is insufficient in heat resistance after cure.

Although its heat resistance can be improved by adding thereto a polyfunctional epoxy resin such as epoxy cresol novolac and the like, addition of a large quantity of polyfunctional epoxy resin brings about a decrease in toughness and adhesive property.

As an example of improvement of heat resistance, Japanese Patent Publication 52-31000 mentions a resin composition obtained from a polyfunctional epoxy resin and a polyfunctional isocyanate compound. However, the resin composition mentioned there is disadvantageous in that, since isocyanate group is present in a largely excessive quantity as compared with epoxy group, the resulting resin has a high absorbing character, and its composition must be stored in a perfectly closed vessel because it readily reacts with the atmospheric moisture.

On the other hand, Japanese Patent Publication 53-15757 mentions an example of resin composition for use in electric rotatory machines where a diepoxy compound and a diisocyanate compound are convened to a diisocyanate-modified epoxy resin in the first step and the latter is cured in the subsequent step by again using a diisocyanate compound as a curing agent. However, this technique is disadvantageous in that, since a diisocyanate compound is used as curing agent, the cured product has a high moisture-absorbing character and is insufficient in adhesive property, so that the product is unusable in electronic parts which must have a high reliability.

Urethane modified epoxy resins are described for example in the U.S. Pat. No. 5,112,932 and on the Japanese Kokai Hei 5-43655.

In the above-mentioned state of things, it is the object of the present invention to provide a novel epoxy resin composition of high reliability which satisfies all the requirements concerning heat resistance, toughness, water resistance and adhesive property in a well-balanced manner.

With the aim of developing an epoxy resin having the above-mentioned excellent performances, the present inventors conducted extensive studies to find that the object can be achieved by a resin having both halogen group and oxazolidone group in the molecular skeleton. Based on this finding, the present invention was accomplished.

Thus, the resin composition of the invention is an epoxy resin composition comprising (A) a reaction product having a terminal epoxy group obtained from an epoxy resin, an isocyanate compound and a phenol compound and (B) a curing agent.

In particular the said reaction product (A) is obtained by reacting a bisphenol type epoxy resin and an isocyanate compound to produce an oxazolidone ring-containing epoxy resin and subsequently reacting the latter with a phenol compound, or the said reaction product (A) is obtained by reacting a bisphenol type epoxy resin and a phenol compound and subsequently reacting an isocyanate compound, or the said reaction product (A) is obtained by heating a mixture consisting of an isocyanate compound and a phenol compound in the presence of a bisphenol type epoxy resin and reacting both of the dissociated isocyanate compound and phenol compound with the bisphenol type epoxy resin.

The present invention is illustrated below in more detail. The present invention is based on a finding that an epoxy resin composition comprising a combination of (A) a terminal epoxy group-containing reaction product obtained from (a) an epoxy resin, (b) an isocyanate compound and (c) a phenol compound and (B) a curing agent is excellent in heat resistance, toughness, water resistance and adhesive property.

Said reaction product (A) is an oxazolidone rings containing epoxy resin containing oxazolidone rings in an amount of preferably 0.5–10 equivalents/kg and more preferably 0.5–5 equivalents/kg.

This is for the reason that the quantity of oxazolidone ring specified above is necessary for exhibiting toughness and heat resistance. If the quantity of oxazolidone ring is smaller than the value specified above, adhesive property deteriorates.

Epoxy equivalent of the reaction product (A) is preferably 200–10,000 g/eq, more preferably 300–5,000 g/eq, and yet more preferably 400–2,000 g/eq. If the epoxy equivalent is greater than the above, heat resistance and water resistance are low. If it is smaller than the above, toughness is low.

Examples of the epoxy resin constituting ingredient (a) include epoxy resins obtained by reacting epichlorohydrin with dihydric phenols such as Bisphenol A, Bisphenol F, Bisphenol AD, Bisphenol S, Tetramethylbisphenol A, Tetramethylbisphenol F, Tetramethylbisphenol AD, Tetramethylbisphenol S, biphenols, such as 4,4'-dihydroxy, 3,3',5,5'-tetramethyl-biphenyl and 4,4'-biphenol, dihydroxynaphthalene and the like; epoxy resins obtained by reacting epichlorohydrin with oxidized phenols such as trisphenolmethane and the like; and novolac type epoxy resins such as phenol novolac epoxy resin, cresol novolac epoxy resin and the like.

Further, halogen-containing epoxy resins obtained by halogen-substituting the starting phenols of the above-mentioned epoxy resins and then reacting the halogenated products with epichlorohydrin, such as Tetrabromobisphenol A type epoxy resins, brominated phenol novolac type epoxy resins and the like, are also included. However, the above-mentioned examples of epoxy resin are not limitative.

Among these epoxy resins, epoxy resins obtained by reacting epichlorohydrin with dihydric phenols are preferable, and epoxy resins of relatively low degree of polymerization and having an epoxy equivalent of 100–400 g/eq are particularly preferable. As an example of such epoxy resin, Bisphenol A type epoxy resin having an epoxy equivalent of 170–200 g/eq can be referred to.

Non-limitative examples of the isocyanate compound constituting the ingredient (b) include diisocyanate compounds such as methane-diisocyanate, butane-1,1-diisocyanate, ethane-1,2-diisocyanate, butane-1,2-diisocyanate, trans vinylene-diisocyanate, propane-1,3-diisocyanate, butane-1,4-diisocyanate, 2-butene-1,4-diisocyanate, 2-methylbutene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane-diisocyanate, diphenylsilane-diisocyanate, $\omega,\omega'$-1,3-dimethylbenzene diisocyanate, $\omega,\omega'$-1,4-dimethylbenzene diisocyanate, $\omega,\omega'$-1,3-dimethylcyclohexane diisocyanate, $\omega,\omega'$-1,4-dimethylcyclohexane diisocyanate, $\omega,\omega'$-1,4-dimethylnaphthalene diisocyanate, $\omega,\omega'$-1,5-dimethylnaphthalene diisocyanate, cyclohexane-1,3-diisocyanate, dicyclohexane-4,4-diisocyanate, cyclohexylmethane-1,4-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenylether-4,4'-diisocyanate, diphenylether-2,4'-diisocyanate, naphthalene-1,4-diisocyanate, naphthalene-1,5-diisocyanate, biphenyl-4,4'-diisocyanate, 3,3'-dimethylbisphenyl-4,4'-diisocyanate, 2,3'-dimethoxybisphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfite-4,4'-diisocyanate, diphenylsulfone-4,4'-diisocyanate and the like, and dimers and the like of the above-mentioned polyfunctional isocyanates, blocked isocyanates masked with alcohol and the like, bisurethane compounds; and the like.

These isocyanate compounds may be used either singly or in combination of two or more compounds.

Among these isocyanate compounds, bifunctional isocyanate compounds are preferable. This is for the reason that if functionality is higher than it the resin contains a large quantity of gel and is brittle, and if functionality is lower than it the resin is insufficient in heat resistance and toughness.

Non-limitative examples of the phenol compound constituting ingredient (c) include dihydric phenols such as Bisphenol A, Bisphenol F, Bisphenol AD, Bisphenol S, Tetramethylbisphenol A, Tetramethylbisphenol F, Tetramethylbisphenol AD, Tetramethylbisphenol S, biphenols such as 4,4'-dihydroxybiphenyl, dihydroxy-naphthalene and the like; trihydric phenols such as trisphenolmethane and the like; and novolacs such as phenol novolac, cresol novolac and the like.

Monohydric phenols are also usable. Examples of the monohydric phenol include p-heptylphenol, p-octylphenol, p-nonylphenol, p-dodecylphenol, p-t-butylphenol, p-cumylphenol, cresol, phenol and the like, among which substituted phenols having 4 or more carbon atoms are preferable.

Further, halogen-containing phenols prepared by halogen-substituting the above-mentioned phenols are also included. Preferable examples of the halogen-containing phenol include Tetrabromobisphenol A, brominated phenol novolac, bromophenol, dibromophenol and 2,4,6-tribromophenol. These phenols have 4 halogen atoms in one molecule, which is effective for improving flame retardance.

The halogen-containing phenols can be used either singly or in combination of two or more members.

The reaction product (A) is produced, for example, in the following manner.

According to Method 1, ingredient (a) and ingredient (b) are reacted in the presence of an oxazolidone-forming catalyst to produce an oxazolidone ring-containing epoxy resin, and then the epoxy resin is reacted with ingredient (c) to form reaction product (A).

According to Method 2, ingredient (a) and ingredient (b) are reacted to form a high-molecular weight epoxy resin, and the latter is reacted with ingredient (c) to form reaction product (A).

According to Method 3, ingredient (b) and ingredient (c) are reacted to form a mixture containing a blocked isocyanate compound, and the latter is heated together with ingredient (a) in the presence of an oxazolidone ring-forming catalyst, whereby the dissociated isocyanate compound and the phenol compound react to form reaction product (A).

First, Method 1 will be detailed.

Ingredient (b) is added to ingredient (a) at an equivalent ratio ranging from 100:5 to 100:90. Temperature of the addition is preferably 80°–150° C. This is for the reason that if the temperature is lower than the above productivity of the process deteriorates, and if it is higher than the above the reaction is difficult to control. Ingredient (b) may be blocked with a blocking agent such as C1–C4 alcohols, monohydric phenols and the like. The blocking agent is either recovered by reducing the pressure or introduced into the skeleton of resin.

The oxazolidone-forming catalyst mentioned later is added either before adding the ingredient (b) or after adding it. Preferably, it is added before adding ingredient (b). This is for the reason of preventing the isocyanuric ring-forming side reaction. Preferably, the catalyst is added at a temperature of 80°–150° C.

The reaction temperature is preferably in the range of 120° C. to 200° C. If the reaction temperature is lower than it, formation of oxazolidone ring is insufficient. If the reaction temperature is lower than it, formation of gel is promoted.

The reaction time usually ranges from 15 minutes to 10 hours and preferably from 1 hour to 8 hours, as counted from the time of completing the addition of ingredient (b). This is for the reason that if the reaction time is shorter than the above a large quantity of isocyanate group remains in the product and if the reaction time is longer than the above productivity of the process deteriorates.

The oxazolidone ring-containing epoxy resin thus obtained is named "resin X". Next, a phenol compound is added to resin X for the purpose of polymer formation. The quantity of the phenol compound is 5–95 equivalents, preferably 10–90 equivalents, per 100 equivalents of epoxy group. This is for the reason that if the quantity of phenol compound is smaller than the above a polymerized epoxy resin cannot be obtained and if the quantity of phenol compound is larger than the above formation of gel is promoted.

When the catalyst for the polymer-forming reaction (advance catalyst) is identical with the oxazolidone ring-forming catalyst, addition of the advance catalyst may be omitted. The advance catalyst can be added usually at a temperature ranging from 60° C. to 180° C. When temperature of the oxazolidone ring-forming reaction is too high, the system may be cooled appropriately.

The polymer-forming reaction can be effected usually at a temperature ranging from 120° C. to 200° C. Preferably, the reaction is carried out until completion. Usually, this reaction is continued for a time period of 1–8 hours. Completion of the reaction can be judged with reference to theoretical epoxy equivalent.

Next, Method 2 will be detailed.

Ingredient (c) is added to ingredient (a). Its quantity is 5–95 equivalents, preferably 10–90 equivalents, per 100 equivalents of epoxy group of ingredient (a). This is for the reason that if the quantity of phenol compound is smaller than the above a polymerized epoxy resin cannot be obtained and if the quantity of phenol compound is larger than the above formation of gel is promoted.

The advance catalyst necessary for this reaction can be added usually at a temperature of 20°–120° C. When temperature of the oxazolidone ring-forming reaction is too high, the system may be cooled appropriately.

The advance reaction can be carried out usually at a temperature ranging from 120° C. to 200° C. Preferably, the reaction is carried out until completion. Usually, the reaction is continued for a period of 1–8 hours.

The polymerized epoxy resin thus obtained is named "resin Y".

Ingredient (b) is added in a quantity of 100:5 to 100:90 as expressed in terms of equivalent ratio to the epoxy equivalent of resin Y. Ingredient (b) is added preferably at a temperature of 60°–150° C. This is for the reason that if the temperature of its addition is lower than the above productivity deteriorates and if the temperature is higher than the above the reaction is difficult to control.

Ingredient (b) may be blocked with a blocking agent such as $C_1$–$C_4$ alcohols, monohydric phenols and the like. The blocking agent is recovered at a reduced pressure or introduced into the skeleton of resin.

When the oxazolidone ring-forming catalyst necessary for this reaction is identical with the advance catalyst, addition of the oxazolidone ring-forming catalyst may be omitted. Addition of the oxazolidone ring-forming catalyst can be carried out usually at a temperature ranging from 60° C. to 180° C. If temperature of the oxazolidone ring-forming reaction is too high, the system may be cooled appropriately.

The oxazolidone ring-forming catalyst is added either before adding ingredient (b) or after it. Preferably, the catalyst is added before adding ingredient (b). This is for the reason of preventing the isocyanuric ring-forming side reaction. Preferably, the catalyst is added at a temperature of 80°–150° C.

The reaction is preferably carried out at a temperature of 120°–200° C. This is for the reason that if the reaction temperature is lower than the above the oxazolidone ring cannot be formed sufficiently and undesirable isocyanurate ring is formed and, if the reaction temperature is higher than the above, formation of gel is promoted.

The reaction time ranges usually from 15 minutes to 10 hours and more preferably from 1 hour to 8 hours, as counted from the time of completion of the addition of ingredient (b). This is for the reason that if the reaction time is shorter than the above a large quantity of isocyanate group remains in the product and if the reaction time is longer than the above productivity deteriorates. Preferably, the reaction is carded out until completion. Completion of the reaction can be detected with reference to theoretical epoxy equivalent.

Next, Method 3 will be detailed.

Ingredient (b) and ingredient (c) are added to ingredient (a) so that the ratio of summed equivalents of ingredient (b) and ingredient (c) to the equivalent of ingredient (a) comes to 100:5 to 100:90. The ratio of equivalent of ingredient (b) to equivalent of ingredient (c) is 10:1 to 1:10.

The preferable temperature of the addition ranges from room temperature to 150° C. If the temperature is lower than the above, productivity is low. If the temperature is higher than the above, reaction is difficult to control.

Ingredient (b) is preliminarily mixed with ingredient (c), and the ingredient (b) blocked with ingredient (c) is added to ingredient (a). Otherwise, ingredients (b) and (c) are added to ingredient (a) at a temperature at which neither a reaction between ingredients (a) and (b) nor a reaction between ingredients (a) and (c) takes place substantially. In this case, ingredients (b) and (c) are preferably added in such an order that ingredient (c) is firstly added and ingredient (b) is subsequently added. As used herein, the term "temperature at which no reaction takes place substantially" usually means a temperature of 100° C. or below, preferably 20°–80° C. For the purpose of controlling the reaction temperature, a part of ingredient (b) or (c) may be added at a temperature higher than 100° C. Preferably, the term "a part" means 60% by weight or less based on the total quantity of ingredient (b) or ingredient (c), respectively.

As the catalyst, an oxazolidone ring-forming catalyst and an advance catalyst can be utilized. When these two catalysts are identical with each other, only one of them may be used.

This catalyst is added either before adding ingredient (b) and ingredient (c) or after it. Preferably, it is added before adding ingredient (b) or ingredient (c). This is for the purpose of preventing the isocyanuric ring-forming side reaction. Preferably, this catalyst is added at a temperature ranging from 80° C. to 150° C.

The reaction is preferably carried out at a temperature ranging from 120° C. to 200° C. If the reaction temperature is lower than the above, oxazolidone ring cannot be formed sufficiently and undesirable isocyanurate ring is formed. If the reaction temperature is higher than the above, formation of gel is promoted.

As for the reaction time, it is preferable to make the reaction progress until completion. Completion of the reaction can be judged by checking whether or not the theoretical epoxy equivalent has been exceeded. The necessary reaction time is preferably in the range of 15 minutes to 20 hours and more preferably in the range of 1 hour to 10 hours as counted from the time of complete addition of ingredient (b) or (c). If the reaction time is shorter than the above, a large quantity of isocyanate group remains in the product. If the reaction time is longer than the above, productivity is low.

As a method for producing reaction product (A), combinations of the above-mentioned production processes are also included in the scope of the present invention.

The reaction product (A) thus obtained has a quantity of oxazolidone ring intended in the invention and an epoxy equivalent intended in the invention.

As the ingredient (a) used in this method, the above-mentioned Bisphenol A type epoxy resins are preferable. As the ingredient (b), divalent isocyanate compounds are preferable. As the ingredient (c), Tetrabromobisphenol A containing halogen is preferable.

If a halogen-containing phenol compound is used as ingredient (c), the epoxy resin composition of the present invention exhibits an enhanced flame-retardant effect. Further, the presence of oxazolidone ring synergistically enhances the flame-retardance.

The epoxy resin composition of the present invention contains preferably 5–60% by weight, more preferably 10–52% by weight, yet more preferably 10–45% by weight, and particularly preferably 10–25% by weight, of halogen. If the halogen content is lower than the above, flame retardance is deteriorated. If halogen content is higher than the above, resistance to thermal decomposition is deteriorated. From the viewpoint of exhibiting a flame-retardant effect, the halogen is preferably bromine.

In the epoxy resin composition of the present invention, the quantity of hydrolyzable chlorine is preferably 500 ppm or below, more preferably 200 ppm or below, yet more preferably 100 ppm or below, particularly preferably 50 ppm or below, and most preferably 30 ppm or below.

This is for the reason that, if the quantity of hydrolyzable chlorine in the epoxy resin composition is higher than the quantity specified above, heat resistance is deteriorated and the gold, silver, copper, aluminum and the like used as a conductive material of the circuit and the like are corroded to bring about a decrease in insulating property and the product becomes unusable as an electric and electronic material.

In the resin composition of the present invention, the content of α-glycol is preferably 100 meq/kg or less, more preferably 50 meq/kg or less, yet more preferably 30 meq/kg or less, and particularly preferably 20 meq/kg or less.

This is for the reason that, if the content of α-glycol in the epoxy resin composition is higher than the value specified above, network defects appear in the cured product which deteriorate water resistance and thereby makes product unusable in electronic materials such as laminate, sealing material and the like, nor as composite material, FRTS (fiber reinforced plastic) and the like.

The above-mentioned oxazolidone ring-forming catalyst is a catalyst accelerating the formation of oxazolidone ring by the reaction between an epoxy resin and an isocyanate.

Non-limitative examples of the oxazolidone ring-forming catalyst include lithium compounds such as lithium chloride, butoxylithium and the like; quaternary ammonium salts such as benzyltrimethylammonium periodate, tetramethylammonium chloride, tetramethylammonium bromide, tetramethylammonium iodide, tetrabutylammonium chloride, bromide and iodide and the like; tertiary amines such as dimethylaminoethanol, triethylamine, tributylamine, benzyldimethylamine, N-methylmorpholine and the like; phosphines such as triphenylphosphine and the like; phosphonium compounds such as amyltriphenylphosphonium bromide, diallyldiphenylphosphonium bromide, ethyltriphenylphosphonium chloride, ethyltriphenylphosphonium iodide, tetrabutylphosphonium acetateacetic acid complex, tetrabutylphosphonium acetate, tetrabutylphosphonium chloride, tetrabutylphosphonium bromide, tetrabutylphosphonium iodide and the like; combination of triphenylantimony and iodine; imidazoles such as 2-phenylimidazole, 2-methylimidazole and the like; and alkali metal hydroxides such as sodium hydroxide and the like.

These compounds are used either singly or in combination of two or more members.

Quaternary ammonium salts are preferred.

The advance catalyst is a catalyst accelerating the reaction between an epoxy resin and a phenol compound. It can be selected from known advance catalysts and the above-mentioned oxazolidone ring-forming catalysts, too.

The mount of the oxazolidone ring-forming catalyst or advance catalyst is 5 ppm to 20,000 ppm, preferably 10 ppm to 10,000 ppm, more preferably 10–5,000 ppm, and yet more preferably 10–1,000 ppm, all based on the total weight of the composition.

This is for the reason that if the mount of the catalyst is larger than the above the catalyst remains in the resin as an impurity and deteriorates insulating property and moisture resistance of the composition when the composition is used as a material of a laminate or a sealing material and if the amount of the catalyst is smaller than the above productivity becomes low.

If desired, all the steps of the production methods mentioned above can be carried out in an appropriate solvent capable of dissolving the formed resin.

When a solvent is used, the solvent is preferably an inert solvent such as N-dimethylformamide, N,N-diethylformamide, N-methyl-2-pyrrolidone, dimethyl sulfoxide, dimethylphosphoramide, methyl ethyl ketone, xylene, toluene, methyl cellosolve, tetrahydrofuran and the like.

Examples of the curing agent usable in the resin composition of the present invention include amine type curing agents, dicyandiamide, polyaminoamide type curing agents, acid and acid anhydride type curing agents, tertiary amines, imidazoles, Lewis acids, Brönsted acid salts, polymercaptan type curing agents, phenolic resin, resol resin, urea resin, melamine resin, isocyanate compounds, blocked isocyanates, novolac phenols and the like.

As the amine type curing agent, aliphatic amines, aromatic amines, secondary amines and tertiary amines can be referred to.

Examples of the aliphatic amine include acyclic amines such as ethylenediamine, 1,3-diaminopropane, 1,4-diaminopropane, hexamethylenediamine, 2,5- dimethyl-hexamethylenediamine, trimethylmethylenediamine, diethylenetriamine, iminobispropylamine, bis(hexamethylene)triamine, triethylenetetramine, tetraethylenepentamine, pentaethylenehexamine, aminoethylethanolamine, tri(methylamino)hexane, dimethylaminopropylamine, 1,3,6-trisaminomethylhexane, polymethylenediamine, trimethylhexamethylenediamine, diethyleneglycolbis-propylene diamine, diethylaminopropylamine, methyliminobispropylamine, 2,5-dimethyl-2,5-hexanediamine and the like; cyclic amines such as tris(4-amino-3-methylcyclohexyl)-methane, menthenediamine, isophoronediamine, diaminodicyclohexylmethane, ethylamino-piperazine, hydrogenated product of 1,3,5-tris(aminomethyl)-benzene, aminoethylpiperazine and the like; and aromatic ring-containing aliphatic amines such as tetrachloro-p-xylylenediamine, m-xylenediarnine, p-xylenediamine and the like.

Examples of the aromatic amines include m-phenylenediamine, o-phenylenediamine, p-phenylenediamine, 2,4-diaminoanisole, 2,4-toluenediamine, 2,4-diaminodiphenylmethane, 4,4-diaminodiphenylmethane, 2,4-diaminodiphenyl sulfone, 4,4'-diaminodiphenyl sulfone, diaminodixylyl sulfone, 3,3'-diethyl-4,4'-diaminodiphenylmethane, 2,6-diaminopyridine, m-aminophenol, m-aminobenzylamine, 4-chloro-o-phenylenediamine and the like.

Examples of the secondary and tertiary amines include triethylamine, benzyldimethylamine, 2-(dimethylaminoethyl)-phenol, 2,4,6-tris(dimethylaminomethyl)-phenol, tetramethylguanidine, triethanolamine, N,N-dimethylpiperazine, 1,4-diazabicyclo(2,2,2)octane(triethyldiamine), pyridine, picoline, piperidine, pyrrolidine, tris(dimethylaminomethyl)phenol-tris-ethylhexanoate and the like.

As examples of the polyaminoamide type curing agent, commercially available products such as Tomide (manufactured by Fuji Kasei Co., Ltd.), Versamide and Genamide (manufactured by Henkel Hakusui Co., Ltd.), Luckamide (manufactured by Dainippon Ink Co., Ltd.), Polymide (manufactured by Sanyo Kasei Co., Ltd.) and the like can be referred to.

Examples of the acid type and acid anhydride type curing agents include dodecenylsuccinic anhydride, polyadipic acid anhydride, polyazelaic acid anhydride, polysebacic acid anhydride, poly(ethyloctadecan-dioic acid) anhydride, poly(phenylhexadecan-dioic acid) anhydride, methyltetrahydrophthalic anhydride, methylhexahydrophthalic anhydride, methyl hymic anhydride, hexahydrophthalic anhydride, tetrahydrophthalic anhydride, trialkyltetrahydrophthalic anhydride, methylcyclohexenedicarboxylic acid anhydride, phthalic anhydride, trilletic anhydride, pyromellitic anhydride, benzophenone-tetracarboxylic acid anhydride, ethyleneglycolbistrimellitate, Het Acid Anhydride (hexachloroendomethylen tetrahydrophthalic anhydride), tetrabromophthalic anhydride and the like.

Examples of the tertiary amine include tris(dimethylaminomethyl)-phenol, dimethylbenzylamine, 1,8-diazocyclo(5,4,0)undecane and the like.

Examples of the imidazole include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-undecylimidazolium trimellitate, 1-cyanoethyl-2-phenylimidazolium trimellitate, 2-methylimidazolium isocyanurate, 2-phenylimidazolium isocyanurate, 2,4-diamino-6-[2-methylimidazolyl-(1)]-ethyl-s-triazine, 2,4-diamino-6-[-2-ethyl-4-methylimidazolyl-(1)]-ethyl-s-triazine, 2,4-diamino-6-[2-undecylimidazolyl-(1)]-ethyl-s-triazine, 2-phenyl-4,5-dihydroxymethylimidazole, 2-phenyl-4-methyl-5-hydroxymethylimidazole, 1-cyanoethyl-2-phenyl-4,5-di(cyanoethoxymethyl)-imidazole, 1-dodecyl-2-methyl-3-benzylimidazolium chloride, 1,3-dibenzyl-2-methylimidazolium chloride and the like.

As the Lewis acid and Brönsted acid salt, boron trifluoride-amine complex, phosphorus pentafluoride-amine complex, arsenic pentafluoride-amine complex, antimony pentafluoride-amine complex and the like can be referred to. As the polymercaptan type curing agent, commercially available products such as Capcure, Epomate (manufactured by Yuka Shell Epoxy Co. Ltd.), Adeka Hardener (manufactured by Asahi Denka Co. Ltd.) and the like can be referred to.

As the novolac phenol, phenol novolac, cresol novolac and the like can be referred to. These curing agents are not limited to the above-mentioned ones. The curing agent is used either singly or in combination of two or more members.

As the curing agents capable of improving heat resistance which can be used in the invention, dicyandiamide, aromatic amines, acid anhydrides and novolac phenols are preferable, among which dicyandiamide and aromatic amines are particularly preferable.

The curing agent is used usually in an amount of 0.1–50% by weight and preferably in an amount of 0.1–40% by weight, based on the total weight including the resin composition of the invention. The particularly proper quantity of curing is dependent on the kind of the curing agent.

For example, based on the total weight of the resin composition of the invention, amine type curing agents are preferably used in an amount of 1–50% by weight and dicyandiamide is preferably used in an amount of 0.1–10% by weight. If the amount of curing agent is larger than the above, the heat resistance of epoxy resin cannot be exhibited. If the amount of curing agent is smaller than the above, cure of the epoxy resin is insufficient.

The resin composition of the invention can be made into an epoxy resin varnish by dissolving it into a solvent. The solvents usable for this purpose include acetone, methyl ethyl ketone, methyl cellosolve, methyl isobutyl ketone, dimethylformamide and the like.

In preparing an epoxy resin varnish, a curing accelerator can also be compounded into the composition. As the curing accelerator, imidazoles, tertiary amines, phosphines, aminotriazoles and the like can be used.

The epoxy resin thus obtained is successfully usable in the fields where heat resistance, toughness, water resistance and adhesive property are required, such as coating material for use in civil engineering and construction, powder coating material, PCM coating material, laminate, sealing material, casting material, adhesive, composite material and the like, and it is particularly successfully usable in the fields where a high reliability is required such as laminate, sealing material and powder coating material.

Next, the present invention will be illustrated in more detail by way of the following examples. The invention is by no means limited by these examples.

The characteristic properties referred to in the examples were measured by the following methods.

(1) Epoxy equivalent

This is mass of resin containing 1 gram equivalent of epoxy group. It was determined according to JIS K-7236.

(2) α-Glycol content

Three grams of sample were dissolved into 25 ml of chloroform. After adding 25 ml of a solution of benzyltrimethylammonium periodate, it was reacted for 2.5 hours. After adding 5 ml of 2N aqueous sulfuric acid and 15 ml of 20% aqueous solution of potassium iodide, the mixture was titrated with 0.1N solution of sodium thiosulfate.

(3) Content of hydrolyzable chlorine

Three grams of sample were dissolved into 50 ml of toluene. After adding thereto 20 ml of 0.1N methanolic solution of KOH and boiling the mixture for 15 minutes, it was titrated with silver nitrate to determine total chlorine content. On the other hand, inorganic chlorine content was determined by dissolving the same sample as above into toluene and titrating it with silver nitrate. By subtracting the inorganic chlorine content from the total chlorine content, the content of hydrolyzable chlorine was determined.

(4) Bromine content

Sample (0.1 g) was dissolved into 15 ml of dimethylformamide. After adding thereto 0.4 g of palladium-carbon catalyst and 10 ml of a solution of sodium borohydride (NaBH4 6 g/2N NaOH aq. 100 ml) and reacting them at 150° C. for 2 hours, 20 ml of pure water, 120 ml of acetic acid and 300 ml of methyl ethyl ketone were added and the whole was titrated with silver nitrate.

(5) Glass transition temperature (Tg)

A varnish was cured in oven at 170° C. for 60 minutes, after which Tg was measured by means of DSC (DSC 220 manufactured by SEIKO).

(6) Erichsen elongation

A varnish was applied to a test plate (manufactured by Japan Test Panel Co.; JUS-G 3141 (SPCC-SB)) having a thickness of 0.8 mm by means of a 0.2 mm applicator. After curing it in oven at 170° C. for 60 minutes, its Erichsen elongation was measured according to JIS-Z-2247.

(7) Solder heat resistance

A laminate board was dipped for 30 seconds in a solder bath kept at a prescribed temperature, after which the swelling on the surface of laminate was visually examined. Criterion of the evaluation was as follows: o: No swelling; Δ: Area of swelling smaller than 10%; x: Area of swelling 10% or above.

In an additional test, a laminate board was dipped in boiling water for one hour, and thereafter the same test as above was repeated.

(8) Copper foil peeling strength

The strength exhibited at the time of vertically peeling off copper foil from laminate board was measured by means of a tensile tester (Autograph AG-5000D, manufactured by Shimazu Seisakusho).

(9) Flame retardance

It was measured according to UL Standard (UL-94).

REFERENTIAL EXAMPLE 1

The diglycidyl ether used in Production Example 1-10 is prepared by reacting Bisphenol A and epichlorohydrin according to known method. The product is named Glycidyl Compound A. Its properties are shown in Table 1.

TABLE 1

|  | Epoxy equivalent (g/eq) | α-Gylcol (meq/kg) | Hydrolizable chlorine (ppm) |
|---|---|---|---|
| Glycidyl Compound A | 185 | 20 | 20 |

REFERENTIAL EXAMPLE 2

The high-bromine type epoxy resin used in Production Example 1-6 is prepared by reacting Tetrabromobisphenol A and epichlorohydrin according to known method. The product is named High-bromine Type Resin A. Its properties are shown in Table 2.

TABLE 2

|  | Bromine content (% by wt.) | Epoxy equivalent (g/eq) | α-Gylcol (meq/kg) | Hydrolizable chlorine (ppm) |
|---|---|---|---|---|
| High-bromine Type Resin A | 48.3 | 407 | 20 | 20 |

REFERENTIAL EXAMPLE 3

Low-bromine type epoxy resins are prepared by reacting a glycidyl compound and Tetrabromobisphenol A according to known method. The products thus obtained are named Low-bromine Type Resin B and C. Their properties are shown in Table 3.

TABLE 3

|  | Bromine content (% by wt.) | Epoxy equivalent (g/eq) | α-Gylcol (meq/kg) | Hydrolizable chlorine (ppm) |
|---|---|---|---|---|
| Low-bromine Type Resin B | 21.0 | 493 | 10 | 10 |
| Low-bromine Type Resin C | 24.5 | 682 | 8 | 8 |

In the following production example 1 to 10, "parts" mean "grams".

PRODUCTION EXAMPLE 1

Into a 300 ml round-bottom flask equipped with a stirrer, a thermometer and a heating device are charged 100 parts of Epoxy Resin A, 7.2 parts of Millionate MT (MDI manufactured by Japan Polyurethane Co.; 4,4'-diphenylmethane diisocyanate) and 0.5 part of tetramethylammonium iodide. The mixture is stirred for 3 hours at a constant reaction temperature of 175° C. Then, the inner temperature is lowered to 120° C., and 59.5 parts of Tetrabromobisphenol A (hereinafter referred to as TBBA) are added, after which the resulting mixture is heated to 160° C. and stirred at that temperature for 4 hours.

The product thus obtained is named Epoxy Resin E.

PRODUCTION EXAMPLE 2

Production Example 1 is repeated, except that the amount of Millionate MT is altered to 10.9 parts and the amount of TBBA is altered to 61.5 parts.

The product thus obtained is named Epoxy Resin F.

PRODUCTION EXAMPLE 3

Production Example 1 is repeated, except that the amount of Millionate MT is altered to 14.8 parts and the amount of TBBA is altered to 63.8 parts.

The product thus obtained is named Epoxy Resin G.

PRODUCTION EXAMPLE 4

Production Example 1 is repeated, except that the amount of Millionate MT is altered to 19.1 parts and the amount of TBBA is altered to 66.1 parts.

The product thus obtained is named Epoxy Resin H.

PRODUCTION EXAMPLE 5

Production Example 3 is repeated, except that Millionate MT is replaced with 14.8 parts of Millionate MTL (manufactured by Japan Polyurethane Co.; MDI liquid at ordinary temperature prepared by partially carbodiimidating 4,4'-diphenylmethanediisocyanate).

The product thus obtained is named Epoxy Resin I.

PRODUCTION EXAMPLE 6

Production Example 3 is repeated, except that Millionate MT is replaced with 14.8 parts of Collonate T-100 (TDI manufactured by Japan Polyurethane Co.; 2,4-tolylene diisocyanate 95% or more, 2,6-tolylene diisocyanate 5% or less).

The product thus obtained is named Epoxy Resin J.

PRODUCTION EXAMPLE 7

Into a 300 ml round-bottom flask equipped with a stirrer, a thermometer and a heating device are charged 100 parts of Epoxy Resin A, 59.5 parts of TBBA and 0.5 part of tetramethylammonium iodide. While stirring and heating the mixture, the inner temperature is kept at 170° C., and at that temperature the mixture is reacted for 6 hours. Then, 7.2 parts of Millionate MT is added over a time period of one hour, and the reaction is continued for an additional 3 hours.

The product thus obtained is named Epoxy Resin K.

PRODUCTION EXAMPLE 8

Production Example 7 is repeated, except that Millionate MT is replaced with 14.8 parts of Collonate T-100 and TBBA is used in an amount of 63.8 parts.

The product thus obtained is named Epoxy Resin L.

PRODUCTION EXAMPLE 9

Into a 300 ml round bottom flask equipped with a stirrer, a thermometer and a heating device are charged 100 parts of Epoxy Resin A and 0.5 part of tetramethylammonium iodide. After stirring the mixture for 30 minutes, 59.5 parts of TBBA and 7.2 parts of Millionate MT are charged. While stirring and heating the mixture, the inner temperature is elevated to 170° C., and the mixture is reacted at that temperature for 8 hours.

The product thus obtained is named Epoxy Resin M.

PRODUCTION EXAMPLE 10

Into a 300 ml round bottom flask equipped with a stirrer, a thermometer and a heating device are charged 100 parts of Epoxy Resin A and 0.5 part of tetramethylammonium iodide. After stirring the mixture for 30 minutes, a mixture consisting of 49.5 parts of TBBA and 7.2 parts of Millionate MT is added. While stirring and heating the whole mixture, the inner temperature is elevated up to 160° C. in 3 hours.

Then, 10.0 parts of TBBA is additionally charged, and the inner temperature is elevated to 170° C. in one hour. Then, the reaction is continued at that temperature for an additional 5 hours.

The product thus obtained is named Epoxy Resin N.

Properties of the epoxy resins obtained in Production Examples 1-10 are summarized in Table 4.

TABLE 4

|  | Epoxy (g/eq) | α-Gylcol (meq/kg) | Hydrolizable chloride (ppm) | Bromine content (% by wt.) |
| --- | --- | --- | --- | --- |
| Epoxy Resin E | 632 | 12 | 14 | 21.0 |
| Epoxy Resin F | 760 | 10 | 12 | 21.1 |
| Epoxy Resin G | 956 | 10 | 10 | 21.0 |
| Epoxy Resin H | 1,285 | 8 | 8 | 21.0 |
| Epoxy Resin I | 878 | 10 | 10 | 20.9 |
| Epoxy Resin J | 1,322 | 10 | 10 | 21.0 |
| Epoxy Resin K | 642 | 12 | 15 | 21.0 |
| Epoxy Resin L | 1,340 | 12 | 11 | 21.0 |
| Epoxy Resin M | 635 | 13 | 12 | 21.0 |
| Epoxy Resin N | 628 | 15 | 18 | 21.0 |

EXAMPLES 1-10

Using Epoxy Resins E to N obtained in Production Examples 1-10, epoxy resin varnishes are prepared according to the formulation shown in Table 5. The amounts given in this Table mean parts by weight.

Each varnish is impregnated into a glass cloth (manufactured by Asahi-Schöbel Co., 216L AS450; thickness of treatment 0.1 mm) and dried at 160° C. to obtain a prepreg having a resin content of about 40%.

After superposing 8 sheets of each prepreg, a copper foil having a thickness of 35μ is placed on both sides, and the whole is molded at 170° C. for 60 minutes under a pressure of 30 kg/cm² to obtain a copper-lined laminate.

Comparative Examples 1-3

Using the epoxy resins shown in Tables 5 and 6, epoxy resin varnishes are prepared according to the formulation shown in Tables 5 and 6, from which copper-lined laminates are prepared by the same procedure as in Examples 1-10. The amounts given in Table 5 and 6 mean parts by weight.

TABLE 5

|  | Example 1 | Example 2 | Example 3 | Example 4 | Example 5 | Example 6 |
| --- | --- | --- | --- | --- | --- | --- |
| Epoxy Resin E | 100 |  |  |  |  |  |
| Epoxy Resin F |  | 100 |  |  |  |  |
| Epoxy Resin G |  |  | 100 |  |  |  |
| Epoxy Resin H |  |  |  | 100 |  |  |
| Epoxy Resin I |  |  |  |  | 100 |  |
| Epoxy Resin J |  |  |  |  |  | 100 |
| Epoxy Resin K |  |  |  |  |  |  |
| Epoxy Resin L |  |  |  |  |  |  |
| Epoxy Resin M |  |  |  |  |  |  |
| Epoxy Resin N |  |  |  |  |  |  |
| Brominated Compound A |  |  |  |  |  |  |

TABLE 5-continued

|  | Example 1 | Example 2 | Example 3 | Example 4 | Example 5 | Example 6 |
|---|---|---|---|---|---|---|
| Low-bromine Type Resin B |  |  |  |  |  |  |
| Low-bromine Type Resin C |  |  |  |  |  |  |
| GY 250 *1 |  |  |  |  |  |  |
| ECN 299 *2 |  |  |  |  |  |  |
| Dicyandiamide | 2.0 | 1.7 | 1.3 | 1.0 | 1.4 | 1.3 |
| 2-Ethyl-4-methyl-imidazole | 0.2 | 0.2 | 0.2 | 0.2 | 0.2 | 0.2 |
| Dimethylformamide | 20 | 20 | 20 | 20 | 20 | 20 |
| Methyl cellosolve | 20 | 20 | 20 | 20 | 20 | 20 |
| Methyl ethyl ketone | 20 | 20 | 20 | 20 | 20 | 20 |

TABLE 6

|  | Example 7 | Example 8 | Example 9 | Example 10 | Comparative Ex.1 | Comparative Ex.2 | Comparative Ex.3 |
|---|---|---|---|---|---|---|---|
| Epoxy Resin E |  |  |  |  |  |  |  |
| Epoxy Resin F |  |  |  |  |  |  |  |
| Epoxy Resin G |  |  |  |  |  |  |  |
| Epoxy Resin H |  |  |  |  |  |  |  |
| Epoxy Resin I |  |  |  |  |  |  |  |
| Epoxy Resin J |  |  |  |  |  |  |  |
| Epoxy Resin K | 100 |  |  |  |  |  |  |
| Epoxy Resin L |  | 100 |  |  |  |  |  |
| Epoxy Resin M |  |  | 100 |  |  |  |  |
| Epoxy Resin N |  |  |  | 100 |  |  |  |
| Brominated Compound A |  |  |  |  | 43 |  |  |
| Low-bromine Type Resin B |  |  |  |  |  |  |  |
| Low-bromine Type Resin C |  |  |  |  |  | 100 | 86 |
| GY 250 *1 |  |  |  |  | 57 |  |  |
| ECN 299 *2 |  |  |  |  |  |  | 14 |
| Dicyandiamide | 2.0 | 1.3 | 2.0 | 2.0 | 5.2 | 2.6 | 2.4 |
| 2-Ethyl-4-methyl-imidazole | 0.2 | 0.2 | 0.2 | 0.2 | 0.2 | 0.2 | 0.2 |
| Dimethylformamide | 20 | 20 | 20 | 20 | 20 | 20 | 20 |
| Methyl cellosolve | 20 | 20 | 20 | 20 | 20 | 20 | 20 |
| Methyl ethyl ketone | 20 | 20 | 20 | 20 | 20 | 20 | 20 |

*1: Manufactured by Ciba Geigy Ltd. (Bisphenol A type epoxy resin, epoxy equivalent 185 g/eq, hydrolizable chlorine 500 ppm, α-glycol 70 meq/kg)
*2: manufactured by Asahi Chemical Co. (epoxy cresol novolac, epoxy equivalent 220 g/eq)

Tables 7 and 8 illustrate the characteristic properties of the epoxy resin compositions and laminates of Examples and Comparative Examples.

TABLE 7

|  |  | Example 1 | Example 2 | Example 3 | Example 4 | Example 5 | Example 6 |
|---|---|---|---|---|---|---|---|
| Tg (°C.) |  | 140 | 141 | 143 | 145 | 140 | 143 |
| Erichsen elongation (kg/cm) |  | 9.1 | 9.2 | 9.2 | 9.4 | 9.3 | 9.0 |
| Laminate | Copper foil peeling strength (kg/cm) | 2.20 | 2.25 | 2.28 | 2.30 | 2.30 | 2.25 |
|  | Solder heat resistance 280° C./30 sec | ○ | ○ | ○ | ○ | ○ | ○ |
|  | 290° C./30 sec | ○ | ○ | ○ | ○ | ○ | ○ |
|  | After boiling, 280° C./30 sec | ○ | ○ | ○ | ○ | ○ | ○ |
|  | Flame retardance (UL-94) | V–O | V–O | V–O | V–O | V–O | V–O |

TABLE 8

|  |  | Example 7 | Example 8 | Example 9 | Example 10 | Comparative Example 1 | Comparative Example 2 | Comparativ Example 2 |
|---|---|---|---|---|---|---|---|---|
| Tg (°C.) |  | 143 | 140 | 142 | 143 | 134 | 125 | 135 |
| Erichsen elongation (kg/cm) |  | 9.2 | 9.1 | 9.3 | 9.0 | 3.9 | 8.9 | 6.9 |
| Laminate | Copper foil peeling strength (kg/cm) | 2.28 | 2.20 | 2.32 | 2.25 | 0.95 | 2.20 | 1.71 |
|  | Solder heat resistance 280° C./30 sec | ○ | ○ | ○ | ○ | ○ | Δ | ○ |
|  | 290° C./30 sec | ○ | ○ | ○ | ○ | X | X | Δ |
|  | After boiling, 280° C./30 sec | ○ | ○ | ○ | ○ | X | X | X |

TABLE 8-continued

|  | Example 7 | Example 8 | Example 9 | Example 10 | Comparative Example 1 | Comparative Example 2 | Comparativ Example 2 |
| --- | --- | --- | --- | --- | --- | --- | --- |
| Flame retardance (UL-94) | V-O | V-O | V-O | V-O | V-O | V-O | V-O |

Effect of the Invention

It is apparent from the above that all the resin compositions of the present invention have a glass transition temperature (Tg) of 140° C. or above, while all the compositions of the comparative examples 1-3 have a Tg lower than 140° C.

The composition of Comparative Example 2 has an Erichsen elongation of 8.9 kg/cm, demonstrating its relatively high toughness, and its copper foil peeling strength is also high, demonstrating its good adhesive property. However, its Tg is lower than that of any compositions of the present invention by at least 15° C., demonstrating its lowness in heat resistance.

Comparative Example 1 is improved in Tg by about 10° C. as compared with Comparative Example 2. However, its Tg is lower than that of any compositions of the present invention. Further, it is low in toughness and thermal decomposition resistance, too.

Comparative Example 3 is improved in Tg by about 10° C. as compared with Comparative Example 2. However, Comparative Example 3 is inferior in elongation as compared with any composition of the present invention. Further, it is low in copper foil peeling strength.

The compositions of the present invention are better than the compositions of comparative examples in glass transition temperature, Erichsen elongation, copper foil peeling strength and solder heat resistance after boiling, demonstrating their excellency in heat resistance, toughness, adhesive property and water resistance. The compositions of the present invention are superior in flame retardance, too.

We claim:

1. An epoxy resin composition comprising (A) a reaction product having a terminal epoxy group obtained from an epoxy resin, an isocyanate compound and a phenol compound and (B) a curing agent.

2. An epoxy resin composition according to claim 1, wherein said reaction product (A) is a product obtained by reacting an bisphenol type epoxy resin and an isocyanate compound to form an oxazolidone ring-containing epoxy resin and subsequently reacting the latter with a phenol compound.

3. An epoxy resin composition according to claim 1, wherein said reaction product (A) is a product obtained by reacting a bisphenol type epoxy resin and a phenol compound and subsequently reacting an isocyanate compound.

4. An epoxy resin composition according to claim 1, wherein said reaction product (A) is a product obtained by heating a mixture consisting of an isocyanate compound and a phenol compound in the presence of a bisphenol type epoxy resin and reacting both of the dissociated isocyanate compound and phenol compound with the bisphenol type epoxy resin.

5. An epoxy resin composition according to claim 1, wherein the epoxy equivalent of the reaction product (A) is 200–10,000 g/eq.

6. An epoxy resin composition according to claim 1, wherein a bifunctional isocyanate compound is used as the isocyanate compound.

7. An epoxy resin composition according to claim 1, wherein a halogen-containing phenol is used as the phenol compound.

8. An epoxy resin composition according to claim 1, wherein the curing agent (B) is dicyandiamide, an aromatic amine, an acid anhydride or a novolac phenol.

9. An epoxy resin varnish comprising the resin composition according to claim 1.

* * * * *